US006061552A

United States Patent [19]

Cerasini et al.

[11] Patent Number: 6,061,552

[45] Date of Patent: May 9, 2000

[54] EAS PEDESTAL AND METHOD FOR MAKING THE SAME

[75] Inventors: Ricci Silvio Cerasini, Plantation; Dale W. Raymond; Howard M. Shenkel, both of Boca Raton; George Anthony Reynolds, Jr., Boynton Beach, all of Fla.

[73] Assignee: Sensormatic Electronics Corporation, Boca Raton, Fla.

[21] Appl. No.: 09/067,332

[22] Filed: Apr. 28, 1998

[51] Int. Cl.[7] .................................................. H04B 11/12

[52] U.S. Cl. .................. 455/128; 340/572.1; 340/572.8; 361/829

[58] Field of Search ................................ 340/571, 572.1, 340/572.2, 572.7, 572.8, 572.9, 572.6, 572.5, 693.5, 551, 572.3, 573; 455/129, 128, 90, 78, 404, 67.1; 361/831, 679, 736, 829

[56] References Cited

U.S. PATENT DOCUMENTS

| | | | |
|---|---|---|---|
| 4,994,939 | 2/1991 | Rubertus et al. | 361/429 |
| 5,025,246 | 6/1991 | Schenkel | 340/572.8 |
| 5,130,697 | 7/1992 | McGinn | 340/551 |
| 5,260,853 | 11/1993 | Yap et al. | 361/736 |
| 5,349,502 | 9/1994 | Westerberg et al. | 361/829 |
| 5,357,240 | 10/1994 | Sanford et al. | 340/572.8 |
| 5,440,296 | 8/1995 | Nelson | 340/572.1 |
| 5,477,219 | 12/1995 | Zarembo et al. | 340/572.8 |
| 5,650,778 | 7/1997 | Urbas et al. | 340/825.54 |
| 5,654,693 | 8/1997 | Cocita | 340/572.8 |
| 5,745,036 | 4/1998 | Clare | 340/825.54 |
| 5,748,085 | 5/1998 | Davis et al. | 340/572.1 |
| 5,942,978 | 7/1998 | Shafer | 340/572.9 |

*Primary Examiner*—Dwayne D. Bost
*Assistant Examiner*—Jean A. Gelin
*Attorney, Agent, or Firm*—Robin, Blecker & Daley

[57] ABSTRACT

A pedestal assembly for an EAS system comprises an antenna, an electronic assembly, and a support member having at least first and second recesses. The antenna is seated in the first recess and the electronic assembly is seated in the second recess. Bumpers are secured to opposed sides of the support member and a top cap member is applied to the assembled support member and bumpers. Upper ends of front and rear covers are inserted interiorly of the top cap member and thereby retentively circumscribed. Lower ends of the first and second covers are then secured to the support member to complete the pedestal assembly. Field service is facilitated in that all interior components of the pedestal assembly are accessible simply upon unsecuring the lower ends of the covers from the support member and downwardly sliding the covers from the top cap member. The support member comprises a two-layer plastic body, one layer of which defines the first and second recesses. The two-layer plastic body is preferably a thermoformed molded body.

18 Claims, 3 Drawing Sheets

EAS PEDESTAL AND METHOD FOR MAKING THE SAME

FIELD OF THE INVENTION

This invention relates generally to electronic article surveillance (EAS) systems and pertains more particularly to EAS pedestals and methods for making EAS pedestals.

BACKGROUND OF THE INVENTION

EAS pedestals are commonly found at exits of facilities, such as libraries, department stores and the like, and include, within front and rear covers, antennas (coils) transmitting and receiving radiant energy into and from a surveillance zone adjacent the pedestal to detect active, i.e., non-deactivated, EAS markers (tags). Typically, the markers are deactivated at a checkout counter. Where a party seeks to remove a tagged article from the facility fraudulently, the marker is in an activated state and, when the article enters the surveillance zone, an alarm condition is generated by the EAS system.

EAS pedestals presently known are quite labor-intensive in manufacturing assembly and repair. Common construction for pedestals is either a routed center section that contains the coils and is covered with a thermoformed skin or formica, or a molded center section using a process suitable for producing large housings. Bumpers are used to secure the covers to a main chassis, which complicates initial factory assembly and requires almost a complete disassembly of the pedestal to access the coils and printed circuit boards when field service repair is necessary following pedestal installation at a facility.

SUMMARY OF THE INVENTION

A primary object of the subject invention is to provide simplification in EAS pedestal structure and assembly from that heretofore known.

A more particular object of the invention is to simplify both initial factory assembly of pedestals and subsequent access to the pedestal interior as needed in field service.

In the attainment of these and other objects, the invention provides a pedestal assembly for an EAS system, comprising an antenna, an electronic assembly, a support member having at least first and second recesses, the antenna being seated in the first recess and the electronic assembly being seated in the second recess, first and second covers secured to the support member and a top cap member circumscribes upper ends of the first and second covers.

Preferably, the pedestal assembly includes bumpers (sidewalls) mounted on sides of the support member and the bumpers bear lengthwise upon the covers and apply force transversely on the covers.

The electronic assembly may be in the form of a printed circuit board (PCB) arrangement and may include a fan having an exhaust port issuing onto the PCB arrangement and the support member will then be configured with air ducts therein for both communicating ambient exterior air to the intake port of the fan and for exhausting air heated by the PCB arrangement through the top cap member.

The support member may also define channelling for electrical wiring powering the pedestal assembly.

The top cap member is preferably in the form of an alarm lens structure for providing visual indication atop the pedestal assembly of system detection of activated markers.

The support member comprises a two-layer plastic body, one layer of which defines the first and second recesses and the other layer reinforcing the first layer. The two-layer plastic body is preferably a thermoformed molded body or a cold formed bonded assembly.

The invention will be further understood from consideration of the following description of preferred embodiments and methods thereof and from the drawings where like reference numerals identify like parts throughout.

DETAILED DESCRIPTION OF PREFERRED EMBODIMENT AND PRACTICES

Figure 2:
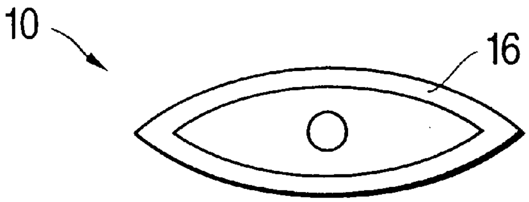
FIG. 2 is a top plan elevation of the FIG. 1 pedestal.
Figure 1:
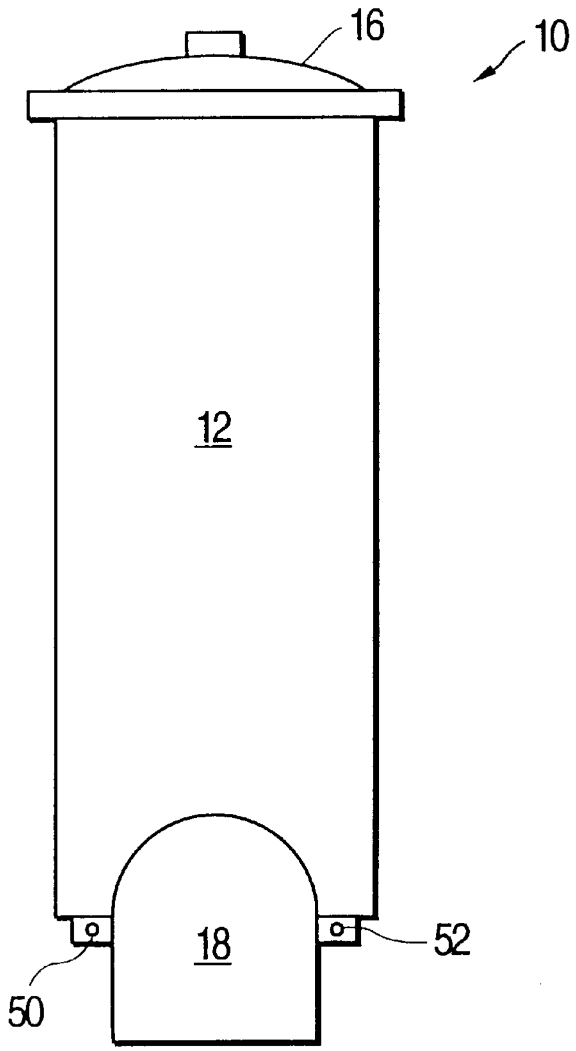
FIG. 1 is a front elevation of a pedestal assembly in accordance with the invention.

Referring to FIGS. 1 and 2, upstanding EAS pedestal assembly 10 includes front arcuate cover 12, a rear arcuate cover 14 (FIG. 4) and a top cap member 16 which includes lens 16*a* and circumscribes the upper ends of the covers. Bumpers (sidewalls) 62*a* and 62*b* bear upon covers 12 and 14 as is discussed more fully hereinafter. The pedestal covers include support legs, one being shown at 18 in FIG. 1.

Figure 3:
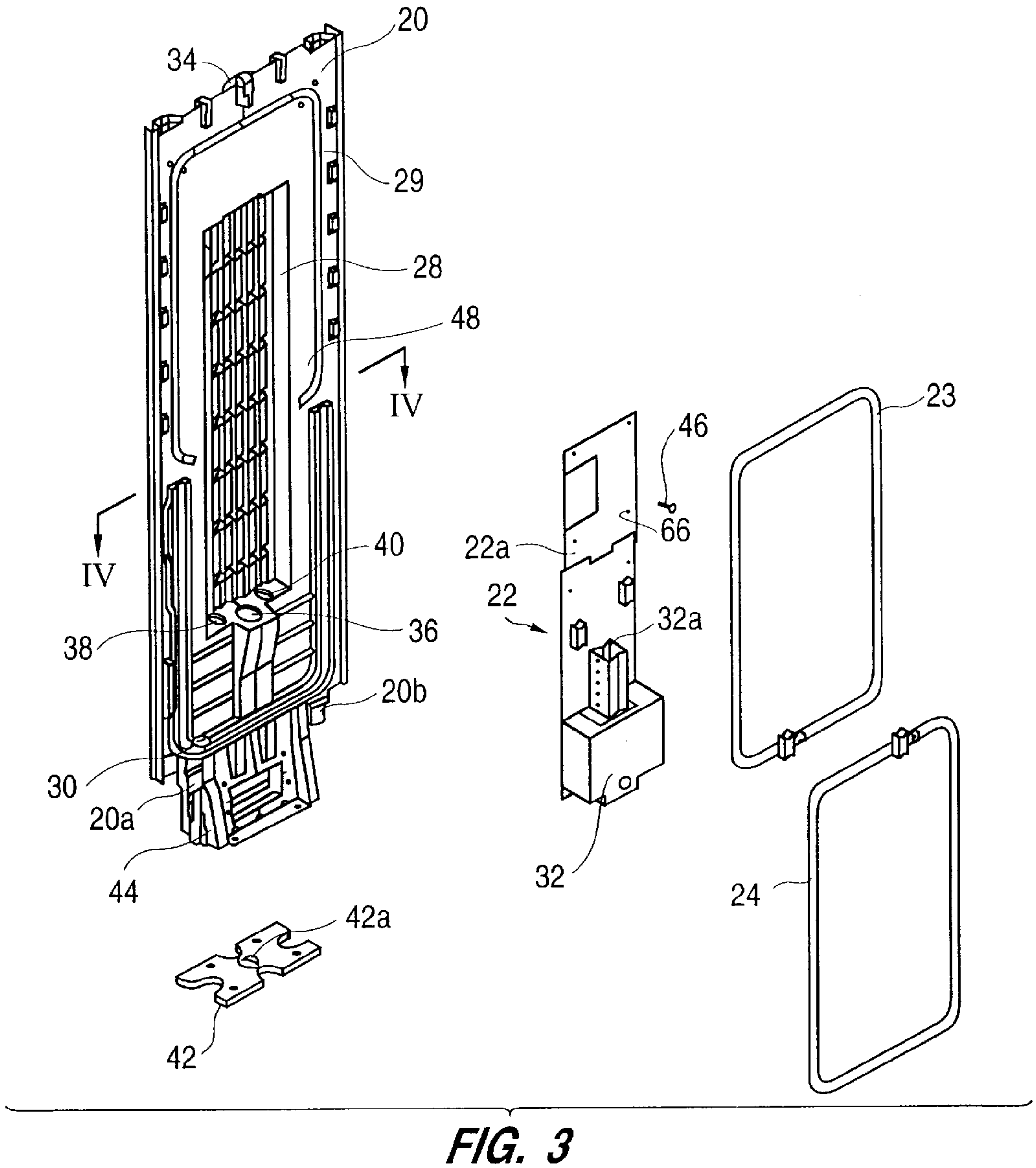
FIG. 3 is an exploded perspective view of certain components of the FIG. 1 pedestal.

Pedestal assembly interior structure is seen in FIG. 3 to include support member 20, printed circuit board (PCB) assembly 22 having printed circuit boards 22*a* and 22*b*, coils 23 and 24 forming loops of a Figure-8 antenna and template 42. A recess 28 is formed generally centrally of support member 20 of configuration complemental to that of PCB assembly 22, so as to receive the same.

Grooves 29 and 30 are formed also in support member 20 of configuration complemental to that of coils 23 and 24, so as to receive and retain the coils with support member 20.

PCB assembly 22 includes a fan 32 which has an exhaust port 32*a* issuing air onto the circuit boards 22*a* and 22*b* for conducting heat away from the circuit boards. Support member 20 defines an air exhaust channel with exhaust port 34 and an intake channel with an exhaust port 36, which is adjacent to the intake port (not shown) of fan 32. Covers 12 and 14 include exhaust vents, that of cover 12 being shown at 12*a* in FIG. 1. Exhaust air impinging on the undersurface of top cap member 16 is deflected downwardly to issue outwardly of pedestal assembly 10 through the cover vents.

Also defined in support member 20 are electrical wiring channels which have openings 38 and 40 to permit electrical wiring to enter and exit the pedestal. Template 42 is securable to the generally inverted T-shaped lower portion 44 of support member 20 and has a central aperture 42*a* and external apertures therein for passage of electrical wiring (not shown) into pedestal assembly 10.

A securement member is indicated at 46 in FIG. 3 and a securement recess is indicated at 48 in support member 20. In accordance with particularly preferred practice per the invention, member 46 is a mechanical quick release fastener and recess 48 is formed to accept and retain fastener 46. Referring to FIG. 1, fasteners 50 and 52, also mechanical quick release fasteners, secure the pedestal assembly cover 12 to support member 20, extending through apertures in lower portion of the cover and seating in sockets formed in portions 20*a* and 20*b* of the support member. Rear cover 14 is likewise secured to the support member by like structure at the rear of the assembly. Covers 12 and 14 are also secured to support member 20 under top cap member 16, as discussed hereinafter.

Figure 4:
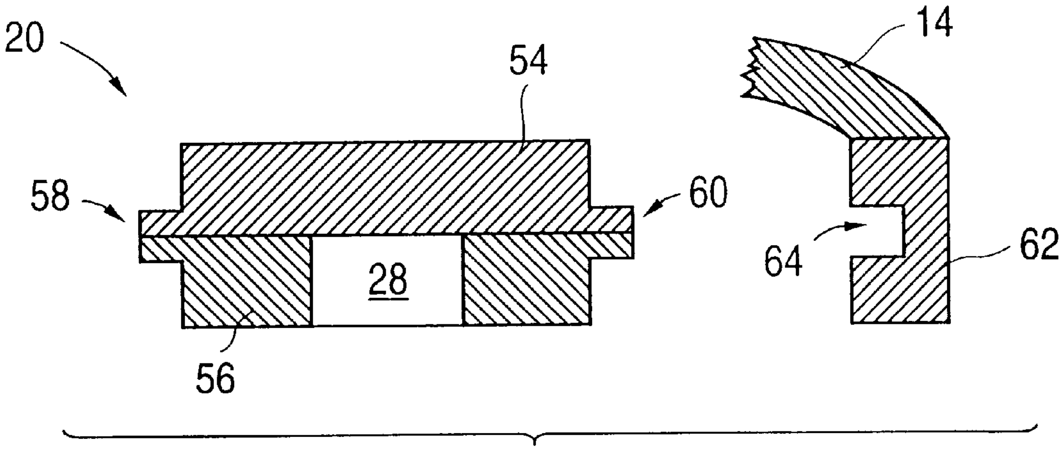
FIG. 4 is a cross-sectional view as would be seen from plane IV—IV of FIG. 3, with various parts omitted in the interests of clarity.

Referring to FIG. 4, support member 20 is constituted as a two-layer member, having mutually secured layers 54 and 56. Further, support member 20 has a hollow section for improved strength and has various projections or bosses on its surfaces, one being indicated at 67 in FIG. 3. Recess 28 is formed in layer 56 and the surface bounding recess 28 is desirable formed with undulations 56*a* which define air ducts below PCB assembly 22 to assist in providing temperature control therefor by conducting forced air from fan 34 therethrough.

Layers 54 and 56 define jointly define projections 58 and 60 lengthwise of support member 20, the projections being configured to retentively seat in channels extending lengthwise through bumpers 62*a* and 62*b*. As is seen at the right side of FIG. 4, projection 60 is seated in channel 64 of bumper 62*b*. Additionally, bumpers 62 and a plurality of bosses (48) formed on layers 54 and 56 are effective so as to compress covers 12 and 14 which increases the vertical strength of pedestal assembly 10.

In reaching the pedestal assembly of the invention, PCB assembly 22 is seated in recess 28 and a plurality of fasteners 46 are passed through PCB assembly mounting apertures 66 into support member 20 sockets 48. Coils 23 and 24 are seated in grooves 29 and 30 and electrical wiring is introduced through secured template 42 through support member 20 channels and connected to PCB assembly 22, inclusive of its fan 32. Coils 23 and 24, jointly forming a single antenna which is time-shared for transmitting and receiving, are energized by transmitter and receiver circuitry of PCB assembly 22.

The assembly bumpers 62*a* and 62*b* are applied to the projections 58 and 60 of support member 20. Top cap member 16 is now secured in sockets 20*c* and 20*d* of support member 20. Upper ends of covers 12 and 14 are now inserted slidingly into the interior of top cap member 16 and the cover lower ends are now secured to support member 20.

In field service, a technician can readily remove the covers by unsecuring their lower ends from the support member and downwardly sliding covers 12 and 14 from top cap member 16. The PCB assembly is thus immediately accessible, as are the coils.

The support member comprises, as noted, a two-layer plastic body, either layer of which defines a singular or plurality of features above discussed. In preferred practice per the invention, the support member is a thermoformed molded body, but the invention is not limited to this process.

In its method aspect, the invention will be seen to involve the steps of preforming a support member with recesses of configuration to receive an electronic assembly for an EAS pedestal and an antenna, inserting the electronic assembly and antenna into the recesses and securing the same and connecting electrical wiring thereto, applying bumpers to sides of the support member and securing a top cap member to the support member and to provide a preassembly. First and second covers are formed with an arcuate configuration to jointly enclose front and rear sides of the preassembly. Upper ends of the covers are slidably inserted interiorly of the top cap member. Lower ends of the covers are secured to the support member in facing relation to the front and rear sides of the preassembly, completing the assembly.

In the preferred practice, the support member is further formed with sideward projections and the bumpers are formed with channels for receiving the projections. The bumpers are applied to receive the projections and marginal portions of the first and second covers are placed in abutment with the bumpers and the support member so as to provide interference between the components and to compress the covers transversely to increase vertical strength. The top cap member is a preferably formed so as to provide a channel for retentively circumscribing upper ends of the covers and upper ends of the bumpers intervening the covers.

Various changes to the particularly depicted embodiment and described practices of the invention may be introduced without departing from the scope of the invention. Accordingly, it is to be appreciated that the particularly disclosed embodiments and practices are intended in an illustrative, and not in a limiting, sense. The true spirit and scope of the invention is set forth in the ensuing claims.

What is claimed is:

1. An upstanding pedestal assembly for an electronic article surveillance system, comprising:

(a) an antenna;

(b) an electronic assembly;

(c) a support member having first and second recesses, said antenna being seated in said first recess, said electronic assembly being seated in said second recess;

(d) first and second bumpers secured to sides of said support member;

(e) a top cap member secured to said support member; and (f) first and second covers secured to said support member to jointly enclose front and rear sides of said support member;

upper ends of said first and second covers being circumscribed by said top cap member and said bumpers abutting said covers and applying transverse compressive force thereto.

2. The pedestal assembly claimed in claim 1, wherein said support member further defines first sockets, first securement members extending through said electronic assembly and being retentively disposed in said first sockets.

3. The pedestal assembly claimed in claim 2, wherein securement members are quick release fasteners.

4. The pedestal assembly claimed in claim 1, further including a fan having an exhaust port adjacent said electronic assembly, said support member further defining an inlet air duct in communication with an inlet of said fan for conducting air ambient to said pedestal assembly to said fan.

5. The pedestal assembly claimed in claim 4, wherein said support member further defines an outlet air duct at an upper end thereof issuing air into said top cap member.

6. The pedestal assembly claimed in claim 5, wherein said first and second covers define exhaust openings communicating with said top cap member interior and wherein air issuing into said top cap member is deflected downwardly to issue to ambient environment through said first and second cover exhaust openings.

7. The pedestal assembly claimed in claim 1, wherein said top cap member includes a lens structure.

8. The pedestal assembly claimed in claim 1, wherein said support member further defines conduit means for receiving electrical cables for providing electrical communication with said electronic assembly and said antenna.

9. The pedestal assembly claimed in claim 8, further including a template secured to a lower end of said support member and defining a passage therethrough in registry with said conduit means permitting feeding of said electrical cables into said conduit means.

10. The pedestal assembly claimed in claim 1, wherein said first and second covers each define first and second apertures at said lower ends thereof, the assembly further including first and second securement members extending through said first and second apertures and retentively disposed in first and second sockets formed in said support member.

11. The pedestal assembly claimed in claim 10, wherein said first and second securement members are quick release fasteners.

12. The pedestal assembly claimed in claim 1, wherein said support member comprises a two-layer plastic body, one layer of which defines said first and second recesses.

13. The pedestal assembly claimed in claim 12, wherein said two-layer plastic body is a thermoformed molded body.

14. The pedestal assembly claimed in claim 1, wherein said antenna comprises first and second coils and wherein said first recess includes first and second grooves for respective seating of said first and second coils.

15. A method for assembling an EAS pedestal, comprising the steps of:

(a) preforming a support member with first and second recesses of configurations respectively to receive an electronic assembly for said EAS pedestal and at least one antenna;

(b) inserting said electronic assembly and said at least one antenna into said first and second recesses;

(c) securing first and second bumpers to opposed sides of said support member;

(d) securing a top cap member to said support member to form a preassembly;

(e) forming first and second covers of configuration to jointly enclose front and rear sides of said preassembly;

(f) inserting upper ends of said first and second covers interiorly of said top cap member; and (g) securing lower ends of said first and second covers to said support member in facing relation to front and rear sides of said preassembly.

16. The method claimed in claim 15, wherein said support member is further formed with sideward projections and said bumpers formed with channels for receiving said projections and said step of securing first and second bumpers to opposed sides of said support member is practiced by inserting said projections in said channels.

17. The method claimed in claim 15, wherein said top cap member is selected to be of configuration for retentively circumscribing upper ends of said first and second covers and upper ends of said bumpers.

18. The method claimed in claim 15, wherein said step of securing lower ends of said first and second covers to said support member in facing relation to front and rear sides of said preassembly is practiced by use of quick release fasteners.

* * * * *